(12) United States Patent
Shah et al.

(10) Patent No.: US 10,969,173 B2
(45) Date of Patent: Apr. 6, 2021

(54) METHOD FOR CONTROLLED CONCENTRATION AND SOLIDS RECOVERY

(71) Applicant: Janak Ramanlal Shah, Mumbai (IN)

(72) Inventors: Janak Ramanlal Shah, Mumbai (IN); Manoj Shyamnarayan Tiwari, Ambernath (IN)

(73) Assignee: Janak Ramanlal Shah, Mumbai (IN)

( * ) Notice: Subject to any disclaimer, the term of this patent is extended or adjusted under 35 U.S.C. 154(b) by 59 days.

(21) Appl. No.: 16/550,241

(22) Filed: Aug. 25, 2019

(65) Prior Publication Data

US 2019/0376744 A1    Dec. 12, 2019

Related U.S. Application Data

(63) Continuation of application No. 14/438,840, filed as application No. PCT/IB2013/002404 on Oct. 28, 2013, now Pat. No. 10,422,580.

(30) Foreign Application Priority Data

Nov. 1, 2012    (IN) .......................... 3175/MUM/2012

(51) Int. Cl.
    *F26B 25/10*   (2006.01)
    *F26B 17/10*   (2006.01)
    *F26B 21/00*   (2006.01)
    *B01D 1/18*    (2006.01)
    *F26B 25/18*   (2006.01)

(52) U.S. Cl.
    CPC ................ *F26B 25/10* (2013.01); *B01D 1/18* (2013.01); *F26B 17/10* (2013.01); *F26B 17/107* (2013.01); *F26B 21/00* (2013.01); *F26B 21/004* (2013.01); *F26B 25/185* (2013.01)

(58) Field of Classification Search
    None
    See application file for complete search history.

(56) References Cited

U.S. PATENT DOCUMENTS 6,249,988 B1 *  6/2001  Duske .................. F26B 11/028
                                                    122/422

* cited by examiner

*Primary Examiner* — Matthew D Krcha
(74) *Attorney, Agent, or Firm* — Dave Law Group LLC; Raj S. Dave

(57) ABSTRACT

The present invention relates to a system for one pot solids recovery from solutions, slurries, emulsions, dispersions, gels, semisolids, and their like. Further the system can be used for controlled concentration of solutions, slurries, emulsions, dispersions, gels, semisolids, and their like to enable easy to operate cost effective energy efficient processes. The system is so constructed to enhance the contact between the liquid medium and the gaseous medium used in the process for effective heat transfer. The system can be used for controlled concentration and/or recovery of substantially dry solids in applications related to foods, nutraceuticals, natural products, pharmaceuticals, chemicals, etc.

20 Claims, 3 Drawing Sheets

METHOD FOR CONTROLLED CONCENTRATION AND SOLIDS RECOVERY

CROSS REFERENCE TO RELATED APPLICATIONS

This application is a continuation of U.S. patent application Ser. No. 14/438,840, filed on Apr. 27, 2015, which is the U.S. National Stage of International Patent Application No. PCT/IB2013/002404, filed on Oct. 28, 2013, which claims the benefit of priority from India Patent Application No. 3175/MUM/2012, filed on Nov. 1, 2012, which are incorporated herein by reference in their entireties.

FIELD OF INVENTION

The present invention relates to a system for one pot solids recovery from solutions, slurries, gels, semisolids, and their like. Further the system can be used for controlled concentration of solutions, slurries, gels, semisolids, and their like.

BACKGROUND OF THE INVENTION

Recovery of solids from solutions, slurries, dispersions, emulsions, gels, semisolids, and their like involves the removal of the solvent and/or the carrier medium by diverse processes that involve evaporation, reverse osmosis, ultra-filtration, pervaporation, freeze concentration, clathration etc. Such processes are generally carried out using various types of equipments such as spray driers, drum driers, freeze driers, foam-mat, fluid bed driers, etc.

Spray driers are routinely used for recovery of solids from solutions/slurries. Similarly, fluid bed driers are routinely used to dry wet solids but cannot be used for recovery of solids from solutions, dispersions, slurries, emulsions, gels, semisolids and their like.

The challenges in technologies related to the treatment of solutions, dispersions, slurries, emulsions, gels, semisolids and their like for the recovery of substantially dry solids are in providing cost effective equipments/systems that enable easy to operate energy efficient processes. The present inventions address this technology gap.

Definition

The term "substantially dry solids" when used herein shall mean the "loss on drying" to be less than 10% by weight of the solids, preferably less than 5% by weight of the solids, more preferably less than 2% by weight of the solids and most preferably less than 1% by weight of the solids depending on the type and nature of the material and the method used for its determination.

OBJECTS OF THE INVENTION

The main object of the invention is to provide a solid recovery system for the recovery of substantially dry solids from solutions, dispersions, slurries, emulsions, gels, semisolids and their like that enables easy to operate cost effective energy efficient processes.

Another object of the invention is to provide a system for a single pot process for the concentration of solutions, slurries, dispersions, emulsions, gels, semisolids, and further substantially drying the solids for their recovery.

Another object of the invention is to provide a system to enhance the contact between the liquid phase and the gaseous medium used in the process for effective heat transfer for controlled concentration and/or recovery of substantially dry solids from solutions, slurries, dispersions, emulsions, gels, semisolids, and their like.

Yet another object of the invention is to provide a method of using the said system for controlled concentration and/or recovery of substantially dry solids in applications related to foods, nutraceuticals, natural products, pharmaceuticals, chemicals, etc.

Thus in accordance with the invention, the system comprises, a container module, gas pressurizing means, vapor extraction means, and optional filters, wherein the said container module comprises first container that is provided with perforated base for passage of pressurized gas, second container disposed in the said first container so as to form a first continuous annular space on the sides as well as to define space between the base of the said first container and base of the said second container to enable gas flow, wherein the said first annular space is closed on the top, wherein the base of the said second container has a substantially flat bottom, third container disposed inside the said second container to define a second continuous annular space on the sides as well as to define the space between the base of the said third container and the base of the said second container, wherein the said second annular space is closed from top, the base of the said third container being provided with perforations or passages;

the base of the said first container is operably connected with the outlet of the pressurized gas source, the said container module is integrated in a housing with vapor extraction means at the top and an optional filter.

The liquid medium (solution/dispersion/emulsion/slurry/gel/semisolid and their like) is filled in the said third container, and pressurized gas (for example air) is made to flow from the base of the said first container through the said first annular space into the said second annular space and further from the passages in the base of the said third container to mix with the liquid medium, causing the solvent to evaporate and further dry the formed solids in the same system for recovery.

In an embodiment of the process, the hot pressurized gas such as air of appropriate temperature and humidity may be used depending on the nature of the solvent/carrier in the solution, slurry, gel, dispersion, emulsion, semisolid etc.

DETAILED DESCRIPTION OF THE INVENTION

Features and advantages of the invention will become apparent in the following detailed description and the preferred embodiments with reference to the accompanying drawings.

Figure 1:
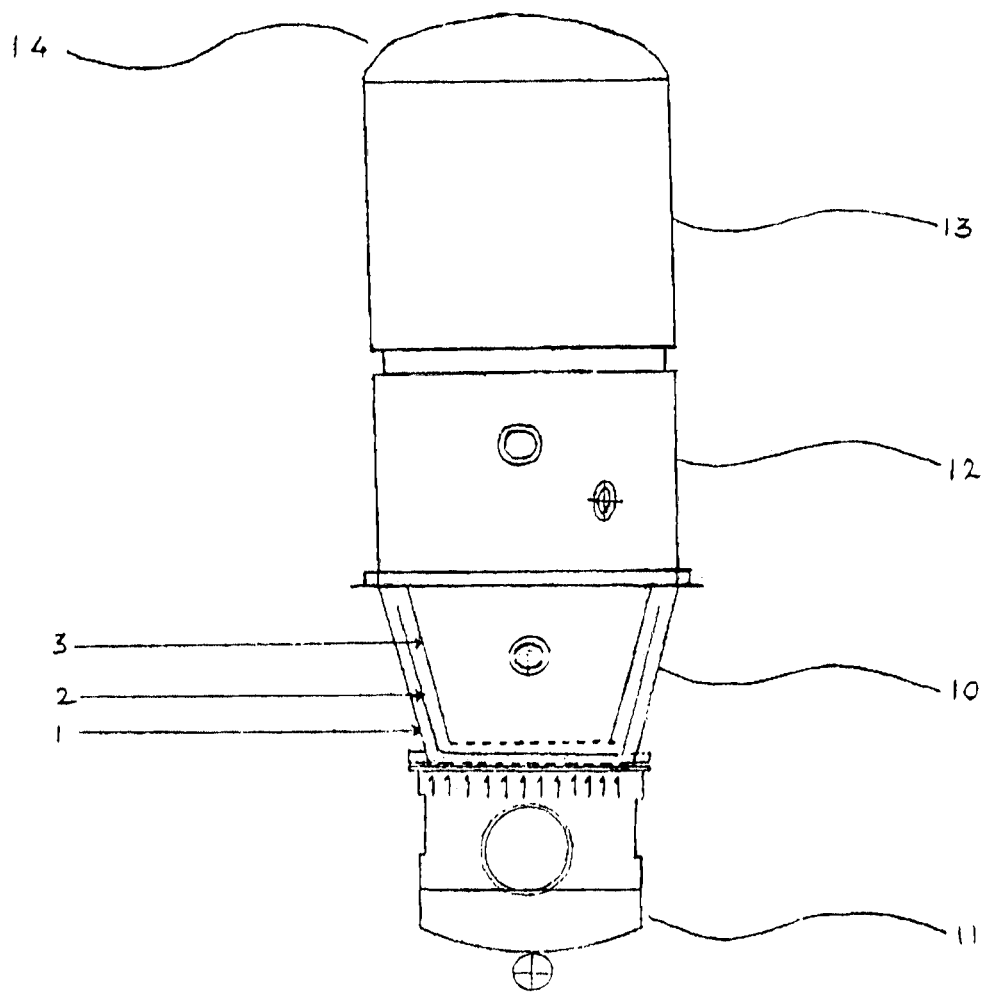
FIG. 1 Schematically shows a system according to an embodiment.

The schematic of the system of the invention is illustrated in FIG. 1. It comprises of a container module 10, gas pressurizing means 11, expansion chamber 12, filter housing 13, vapor exhaust (extraction) port 14.

Figure 2:
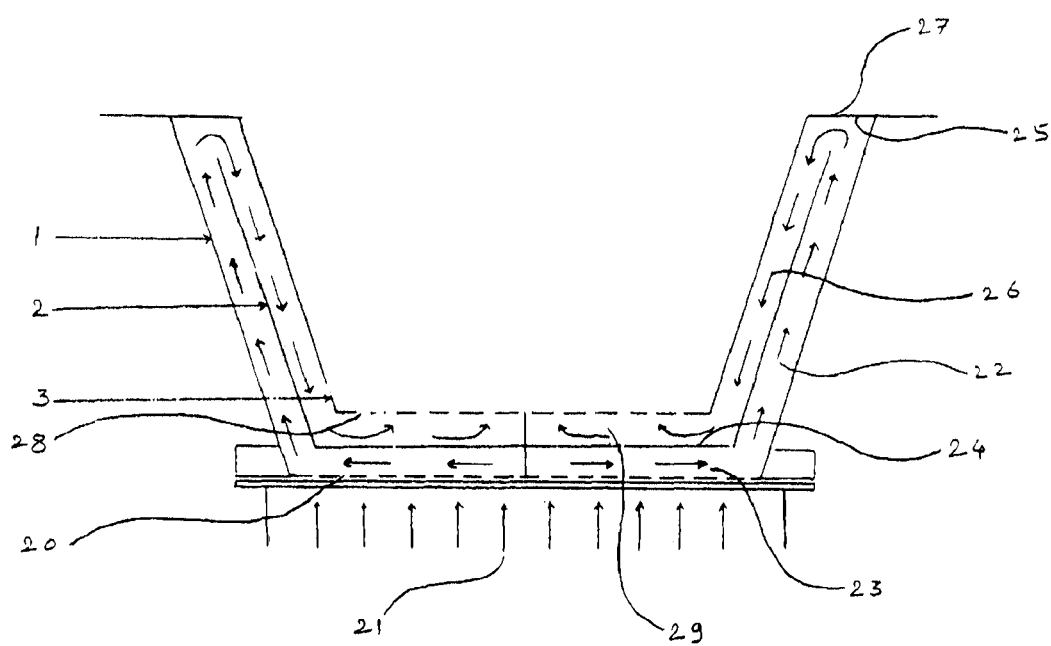
FIG. 2 Schematically shows a flow path of gas through the system of FIG. 1, according to an embodiment.

The schematic of the container module 10 is illustrated in FIG. 2. It comprises of first container 1 that is provided with perforated base or perforated gas distribution plate 20 for gas passage. The flow path of the gas such as pressurized air is indicated in the FIG. 2 by arrow 21 for better understanding. The second container 2 is disposed in the said first container 1 so as to define first annular space 22 between first and the second container as well as to define space 23 between the base 20 of the said first container and base 24 of the said second container 2.

The said first annular space 22 is closed on the top side 25 as illustrated in the FIG. 2. The base 24 of the said second container 2 is substantially flat or is provided with a substantially flat plate. The third container 3 is disposed inside the said second container 2 to define second annular cavity/space 26 as well as to define the space 29 between the base 28 of the said third container and the base 24 of the said second container. The said second annular space 26 is closed from top side 27 as illustrated in the FIG. 2. The base 28 of the said third container 3 is provided with a set of perforations/passages or is provided with a gas distribution plate with a set of perforations/passages.

In one of the embodiments, the said first, second and third containers 1, 2 and 3 respectively are of frusto-conical geometry.

The base 20 of the said first container 1 is operably connected with the outlet of the gas pressurizing means such as compressor or blower. The said container module 10 is operably connected to the expansion chamber 12 and further to the filter housing 13 as depicted in FIG. 1.

In operation, the solution/dispersion/emulsion/slurry/gel/semisolid and their like is filled in the said third container 3. The pressurized gas flows from the base 20 of the said first container 1 through the said space 23 and further through the first annular space 22 into the said second annular space 26. It further passes from the passages in the base 28 of the said third container 3 to mix with the solution/dispersion/emulsion/slurry/gel/semisolid and their like, cause the solvent to evaporate and the dry the resulting solids for final recovery.

In one of the embodiments, the said third container 3 is provided with a set of inclined passages configured to distribute gas in the bulk of the liquid medium (solution/dispersion/emulsion/slurry/gel/semisolid and their like) to create turbulence for enhancement of contact between the gas and the liquid medium for improved heat transfer. In one of the variants of this embodiment, the passages are inclined to the horizontal at 15° to 85°, preferably 25° to 75°.

Figure 3:
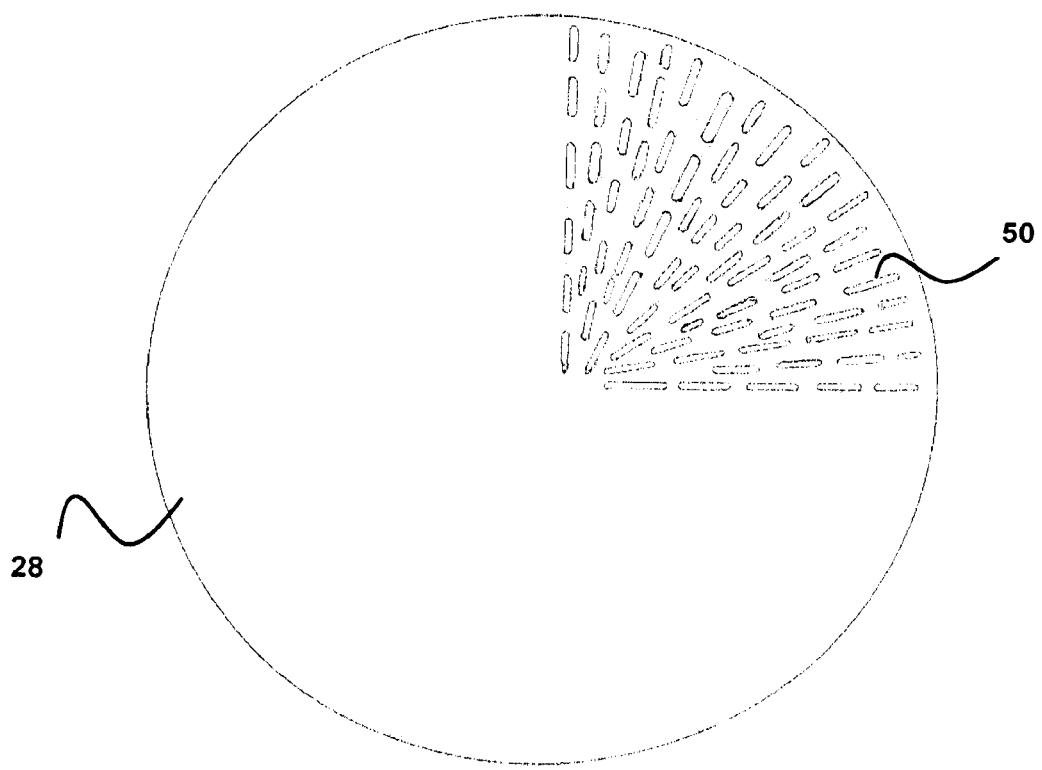
FIG. 3 Schematically shows an exemplary configuration of passages in a base of the system, according to an embodiment.

One of the configurations of the said passages in the said base 28 is depicted in FIG. 3. As an illustration, only quarter of the gas distribution plate is indicated with the configuration of the passages (individual passage is indicated by numeral 50). The said passages may be of any shape such as oval, flat oval, rectangular, circular, square, elliptical, or combinations thereof. The ratio of thickness of the said base 28 to the length of the passage is in the range of 0.250 to 0.999.

The ratio of total area of the passages to the area of the base is in the range of 0.01 to 0.50, preferably 0.03 to 0.30, more preferably 0.05 to 0.10.

In an embodiment of the invention, the said passages are provided with internal serrations to provide swirling motion to the gas passing through it.

In yet another embodiment the passages provided in the base of the said third container are of diverse cross section such as round, oval, flat oval, rectangular, square etc.

In yet another embodiment plurality of passages are provided on the sides of the said third container.

In another embodiment there are more than three containers disposed so as to create more than two annular spaces between them.

The invention further provides non-limiting examples.

Example 1

A solution of 6 kg of sucrose was prepared in 25 kg of water and 5 kg of acetone and filled in third container. The third container was provided with gas distribution plate with passages inclined to the horizontal at 55°. The system was preheated with a stream of hot and dehumidified air. Pressurized hot air was introduced into the system from the bottom of first container and process was run for about 1.5 hours with exhaust kept on to remove the evaporated solvent vapors from the system. The inlet air temperature was about 60° C. to 90° C. resulting in bed temperature of about 30° C. to 55° C. and outlet air/vapor temperature of about 30° C. to 45° C. The solution gradually got concentrated with the emergence of the solids which got dried as a fluidized bed till the solvent was completely removed and the substantially dry solids were obtained. The solid material was removed and weighed. The yield of the process was 96.3% and the moisture content in the solids was ~0.7%.

Example 2

5 kg of non-pareil seeds was added to 25 kg of purified water. The mixture was stirred to obtain a dispersion which was charged in the third container. The third container was provided with gas distribution plate with passages inclined to the horizontal at 55° The process described in example 1 was carried out. At the end of the process, solid material was removed and weighed. The yield of the process was ~95% and the moisture content in the solids was less than 1.5%.

Example 3

0.400 kg of starch was added to 1.5 kg of isopropyl alcohol. The mixture was stirred to obtain a dispersion which was filled in third container. The third container was provided with a gas distribution plate with passages inclined to the horizontal at 25° The system was preheated with a stream of hot and dehumidified air. Pressurized hot air was introduced into the system from the bottom of first container and process was run for about 1 hours with exhaust kept on to remove the evaporated solvent vapors from the system. The inlet air temperature was about 60° C. resulting in bed temperature of about 15° C. to 55° C. and outlet air/vapor temperature of about 20° C. to 45° C. The solution gradually got concentrated with the emergence of the solids which got dried as a fluidized bed till the solvent was completely removed and the substantially dry solids were obtained. The solid material was removed and weighed. The yield of the process was ~81% and the moisture content in the solids was about 5.2%.

Example 4

0.300 kg of povidone K30 was added to 0.13 kg of purified water. The mixture was stirred to obtain a gel. The third container was provided with gas distribution plate with passages inclined to the horizontal at 75° Purified talc (0.007 kg) was sprinkled (applied) to the inner walls of third container and the upper surface of gas distribution plate. The prepared gel was filled in third container. The system was preheated with a stream of hot and dehumidified air. Pressurized hot air was introduced into the system from the bottom of first container and process was run for about 4 hours with exhaust kept on to remove the evaporated solvent vapors from the system. The inlet air temperature was about 65° C. to 85° C. resulting in bed temperature of about 35° C. to 70° C. and outlet air/vapor temperature of about 40° C. to 65° C. The solution gradually got concentrated with the emergence of the solids which got dried as a fluidized bed till the solvent was completely removed and the substantially dry solids were obtained. The solid material was removed and weighed. The yield of the process was 90% and the moisture content in the solids was about 2.8%.

Example 5

0.400 kg of lactose was added to 4.89 kg of purified water. The mixture was stirred to obtain a solution which was filled in third container. The third container was provided with gas distribution plate with passages inclined to the horizontal at 35° The system was preheated with a stream of hot and dehumidified air. Pressurized hot air was introduced into the system from the bottom of first container and process was run for about 3.5 hours with exhaust kept on to remove the evaporated solvent vapors from the system. The inlet air temperature was about 45° C. to 90° C. resulting in bed temperature of about 25° C. to 75° C. and outlet air/vapor temperature of about 30° C. to 60° C. The solution gradually got concentrated with the emergence of the solids which got dried as a fluidized bed till the solvent was completely removed and the substantially dry solids were obtained. The solid material was removed and weighed. The yield of the process was 91.75% and the moisture content in the solids was 0.62%.

The invention described demonstrates the effectiveness of the designed systems that enables a one pot solids recovery from solutions, emulsions, dispersions, slurries, gels, semisolids, and their like. Further the equipment and the process can be used for controlled concentration of solutions, slurries, dispersions, emulsion, semisolids, and gels and materials of their like.

What is claimed is:

1. A method comprising:
operating a fluid-bed system for controlled concentration and recovery of solids,
fluidizing the solids in a fluidized bed, and
drying the solids;
wherein the fluid-bed system comprises a gas pressurizing module, a container module, and a vapor extraction module, in this order arranged from bottom to top of the fluid-bed system such that the container module is located between the gas pressurizing module and the vapor extraction module, wherein the container module is above the gas pressurizing module and the vapor extraction module is above the container module, wherein the gas pressurizing module produces a pressurized gas that is introduced into the container module;
wherein the container module comprises:
a first container that is provided with a first perforated base for movement of the pressurized gas,
a second container disposed in the first container so as to form a first continuous annular space on sides of the first container and the second container as well as to define a first space between the first perforated base of the first container and a base of the second container, and
a third container disposed inside the second container to define a second continuous annular space on sides of the second container and the third container as well as to define a second space between the base of the second container and a second perforated base of the third container, the second perforated base of the third container being provided with a passage;
wherein the first continuous annular space and the second continuous annular space are contiguous;
wherein the first continuous annular space and the second continuous annular space are closed at a top of the first continuous annular space and the second continuous annular space;
wherein the first perforated base of the first container is operably connected with an outlet of the pressurized gas;
wherein the gas pressurizing module, the container module and the vapor extraction module are fixed to each other to form an integrally connected fluid-bed system; and
wherein the first container has a first axis, the second container has a second axis, and the third container has a third axis, and the first axis, the second axis and the third axis are a same axis and are vertical.

2. The method of claim 1, wherein the first container, the second container and the third container are of frusto-conical geometry.

3. The method of claim 1, wherein the passage in the third container is configured to distribute gas in a bulk of a liquid medium to create turbulence for enhancement of contact between the gas and the liquid medium for improved heat transfer.

4. The method of claim 1, wherein the passage is inclined to the horizontal at an angle of 15° to 85°.

5. The method of claim 1, wherein the gas pressurizing module is a compressor or a blower.

6. The method of claim 1, wherein the container module is operably connected to an expansion chamber and further to a filter housing.

7. The method of claim 1, wherein a shape of the passage comprises oval, flat oval, rectangular, circular, square, elliptical or a combination thereof.

8. The method of claim 1, wherein a ratio of a thickness of the second perforated base to a length of the passage is in a range of 0.250 to 0.999.

9. The method of claim 1, wherein a ratio of a total area of the passage to an area of the second perforated base is in a range of 0.01 to 0.50.

10. The method of claim 1, wherein the passage is provided with internal serrations to provide swirling motion to the pressurized gas passing through the passage.

11. The method of claim 1, wherein the passage has a cross section comprising round, oval, flat oval, rectangular, square or a combination thereof.

12. The method of claim 1, wherein more than three containers are disposed to create more than two annular spaces between the more than the three containers.

13. The method of claim 1, wherein the pressurized gas is air.

14. A method for controlled concentration and recovery of solids, from liquid medium, wherein the method comprises:
a) providing a fluid-bed system comprising a gas pressurizing module, a container module, and a vapor extraction module, in this order arranged from bottom to top of the fluid-bed system such that the container module is located between the gas pressurizing module and the vapor extraction module, wherein the container module is above the gas pressurizing module and the vapor extraction module is above the container module, wherein the gas pressurizing module produces a pressurized gas that is introduced into the container module;

wherein the container module comprises:
  a first container that is provided with a first perforated base for movement of the pressurized gas,
  a second container disposed in the first container so as to form a first continuous annular space on sides of the first container and the second container as well as to define a first space between the first perforated base of the first container and a base of the second container, and
  a third container disposed inside the second container to define a second continuous annular space on sides of the second container and the third container as well as to define a second space between the base of the second container and a second perforated base of the third container, the second perforated base of the third container being provided with a passage;
wherein the first continuous annular space and the second continuous annular space are contiguous;
wherein the first continuous annular space and the second continuous annular space are closed at a top of the first continuous annular space and the second continuous annular space;
wherein the first perforated base of the first container is operably connected with an outlet of the pressurized gas;
wherein the gas pressurizing module, the container module and the vapor extraction module are fixed to each other to form an integrally connected fluid-bed system; and wherein the first container has a first axis, the second container has a second axis, and the third container has a third axis, and the first axis, the second axis and the third axis are a same axis and are vertical.

b) filling the liquid medium selected from solution, dispersion, emulsion, slurry, gel or semisolid, into the third container;

c) making pressurized gas flow from the base of the first container, through the first continuous annular space, into the second continuous annular space, and further through the passage in the base of said third container to mix with the liquid medium;

d) causing the solvent to evaporate, concentrating the liquid medium, and recovering the solids from the liquid medium.

15. The method of claim 14, wherein the first container, the second container and the third container are of frusto-conical geometry.

16. The method of claim 14, wherein the passage in the third container is configured to distribute gas in a bulk of a liquid medium to create turbulence for enhancement of contact between the gas and the liquid medium for improved heat transfer.

17. The method of claim 14, wherein the passage is inclined to the horizontal at an angle of 15° to 85°.

18. The method of claim 14, wherein the gas pressurizing module is a compressor or a blower.

19. The method of claim 14, wherein the container module is operably connected to an expansion chamber and further to a filter housing.

20. The method of claim 14, wherein a shape of the passage comprises oval, flat oval, rectangular, circular, square, elliptical or a combination thereof.

* * * * *